(12) United States Patent
Chen et al.

(10) Patent No.: US 7,277,451 B1
(45) Date of Patent: *Oct. 2, 2007

(54) RECOGNITION SCHEME FOR MODERATING WIRELESS PROTOCOLS

(75) Inventors: Minghua Chen, Irvine, CA (US); Ping Liang, Irvine, CA (US)

(73) Assignee: Oxford Semiconductor, Inc., Milpitas, CA (US)

( * ) Notice: Subject to any disclaimer, the term of this patent is extended or adjusted under 35 U.S.C. 154(b) by 765 days.

This patent is subject to a terminal disclaimer.

(21) Appl. No.: 10/211,976

(22) Filed: Jul. 31, 2002
(Under 37 CFR 1.47)

Related U.S. Application Data

(60) Provisional application No. 60/367,664, filed on Mar. 22, 2002, provisional application No. 60/328,882, filed on Oct. 11, 2001.

(51) Int. Cl.
*H04L 12/56* (2006.01)
(52) U.S. Cl. ..................... 370/445; 370/338
(58) Field of Classification Search ............. None
See application file for complete search history.

(56) References Cited

U.S. PATENT DOCUMENTS

| | | |
|---|---|---|
| 5,042,083 A | 8/1991 | Ichikawa |
| 5,682,381 A | 10/1997 | Sekihata et al. |
| 5,852,405 A | 12/1998 | Yoneda et al. |
| 6,278,693 B1 | 8/2001 | Aldred et al. |
| 6,405,257 B1 | 6/2002 | Gersht et al. |
| 6,600,726 B1 | 7/2003 | Nevo et al. |
| 6,690,657 B1 | 2/2004 | Lau et al. |
| 6,775,258 B1 | 8/2004 | van Valkenburg et al. |
| 6,954,616 B2 * | 10/2005 | Liang et al. ............... 455/63.1 |
| 2001/0010689 A1 | 8/2001 | Awater et al. |
| 2002/0061031 A1 | 5/2002 | Sugar et al. |
| 2002/0136183 A1 * | 9/2002 | Chen et al. ................. 370/338 |
| 2002/0136184 A1 * | 9/2002 | Liang et al. ................ 370/338 |
| 2002/0136233 A1 * | 9/2002 | Chen et al. ................. 370/445 |
| 2002/0173272 A1 * | 11/2002 | Liang et al. .................. 455/63 |
| 2002/0191677 A1 | 12/2002 | Chen et al. |
| 2003/0054827 A1 | 3/2003 | Scmidt et al. |
| 2003/0058830 A1 | 3/2003 | Schmidt |
| 2005/0078616 A1 | 4/2005 | Nevo et al. |
| 2005/0130687 A1 | 6/2005 | Filipovic et al. |

OTHER PUBLICATIONS

U.S. Appl. No. 60/238,761.

* cited by examiner

*Primary Examiner*—Chi Pham
*Assistant Examiner*—Phuc Tran
(74) *Attorney, Agent, or Firm*—Knobbe Martens Olson & Bear LLP

(57) ABSTRACT

Wireless communication networks utilize various communication protocols to exchange data between wireless network devices. Overlapping communication frequencies between data exchange protocols present a collision and interference problem when data transmissions are transmitted using similar timing and frequency characteristics during wireless transit. A device and method for receiving and separating collision signals during transit in a wireless communication network where overlapping communication frequencies coexist is described to significantly reduce the loss of data and information caused by interference and colliding transmission signals.

17 Claims, 7 Drawing Sheets

RECOGNITION SCHEME FOR MODERATING WIRELESS PROTOCOLS

CLAIM OF PRIORITY

This U.S. patent application claims priority to U.S. Provisional Patent Application No. 60/328,882, entitled "Recognition Scheme for Moderating Wireless Protocols" filed Oct. 11, 2001, which is hereby incorporated by reference in its entirety. This U.S. patent application also claims priority to U.S. Provisional Patent Application No. 60/367,664, entitled "Recognition Scheme for Moderating Wireless Protocols" filed Mar. 22, 2002, which is hereby incorporated by reference in its entirety. Additionally, this application incorporates by reference in their entirety the following co-pending applications: U.S. patent application Ser. No. 10/003,703, filed Oct. 23, 2001, entitled "Coordination Architecture For Wireless Communication Devices Using Multiple Protocols", U.S. patent application Ser. No. 10/053,860, filed Oct. 25, 2001, entitled "Collision Rectification In Wireless Communication Devices", U.S. patent application Ser. No. 10/066,284 filed Feb. 1, 2002, entitled "Centralized Coordination Point For Wireless Communication Devices Using Multiple Protocols", U.S. patent application Ser. No. 10/106,515, filed Mar. 22, 2002, entitled "Top-Level Controller For Wireless Communication Devices and Protocols", and U.S. Patent Application No. 60/336,339, filed Oct. 18, 2001, and U.S. Patent Application No. 60/367,663, filed Mar. 22, 2002, entitled "Remotely-Cooperative Scheduling Solution For Moderating Wireless Protocols".

BACKGROUND OF THE INVENTION

1. Field of the Invention

The present invention relates to wireless networking systems and, in particular, to a coexistive solution for frequency-overlapping wireless communication protocols.

2. Description of the Related Art

Wireless communication and networking protocols are increasingly used to provide connectivity for diverse classes of electronic devices. These wireless protocols permit electronic devices such as computers, personal digital assistants (PDA), and mobile phones to transmit and receive information without the requirement of physically interconnecting the electronic devices to one another or to communications mediums via wire or cable connections. Wireless connectivity in this manner increases portability and flexibility in electronic devices and has become an important method by which data and information is distributed.

Numerous standards have been proposed for use in transmitting and receiving information in wireless local area networks. Two emerging protocols which have received widespread acceptance include Bluetooth (BT) and IEEE 802.11 (WLAN) wireless protocols. These protocols share a common frequency spectrum in the 2.4-GHz Industrial, Scientific, and Medical (ISM) band and are used to exchange information between electronic devices which support the appropriate protocol. Both protocols offer high speed data exchange rates and may be integrated into devices for connecting to land-based or wired communications networks such as the Internet. In general, wireless protocols, such as BT and WLAN, transmit data by superimposing the desired information on a carrier radio wave. Data is recovered through the use of a receiver which specifically tunes to the transmission frequency of the carrier signal to receive the signal and decode the information contained therein.

The Bluetooth protocol is designed primarily for short-range wireless communication between electronic devices in small localized networks (piconets). The network topology in the Bluetooth piconet comprises up to eight active devices, with a maximum of three synchronous-connection-oriented (SCO) links. These SCO links further support real-time communications such as those required for voice or telephony applications. The Bluetooth protocol additionally supports asynchronous connection links (ACL) which are typically used to exchange data and information in non-time critical applications. Within the piconet topology, only one Bluetooth device may typically transmit at a time, and transmissions are managed using a master/slave relationship. One Bluetooth device is designated as a master device and controls other slave device transmissions within the piconet. The master device coordinates transmissions within the piconet by continually polling the slave devices to determine which slave devices require a clear channel to transmit data. Slave devices receive "permission" from the master device before transmitting information and only transmit information when "asked" to do so by the master device. Controlling slave transmission traffic in this manner permits the master device to schedule and manage information exchange within the piconet and prevents data collisions and corruption due to overlapping data transmissions from multiple devices.

Bluetooth device communication can be further characterized by the use of a frequency-hopping spread spectrum (FHSS) technique. With the FHSS technique, data is transmitted in discrete packets along different frequencies within the 2.4-GHz ISM band. The Bluetooth protocol specifies that frequency hops be made at the rate of approximately 1600 hops/sec such that data exchange takes place with the data spread throughout the ISM band. This type of spread spectrum (SS) technique utilizes a relatively high energy transmission along a narrow band for a limited time.

Alternatively, the WLAN wireless protocols may be used to connect electronic devices in a peer-to-peer network. With the peer-to-peer type of network, there are no strict servers or hierarchy among communicating devices. In this network topology, each electronic device within the wireless network functions as its own server and determines when to send and receive information without a dedicated administrative server or master device. Devices in the WLAN wireless network contend for access to the available radio frequencies and bandwidth using a sensing and collision avoidance protocol to improve the rate of data and information transmission.

WLAN device communication can be further characterized by the use of a direct-sequence spread spectrum (DSSS). In a DSSS communication environment, data is transmitted along a wide bandwidth with relatively low energy. Typically, DSSS divides the available ISM band into eleven to fourteen sub-channels for different countries over the world. Each DSSS network will use a band of several channels centered at one of these standard sub-channels. In a multiple access-area network, overlapping and/or adjacent areas using different channels can operate simultaneously without interference if the distance between the center frequencies is at least 30 MHz. WLAN protocols occupy these fixed channels of the ISM band, (passbands), to transmit and receive information between compatible devices.

While the aforementioned wireless protocols function well in environments where only one wireless protocol in the ISM band is in operation, a problem arises in local area networks where Bluetooth and WLAN devices coexist. The shared frequency range of the two protocols inevitably results in transmission interference and data corruption as the two protocols operate with transmission frequencies that overlap at various times during routine transmission of information. The resulting frequency overlap degrades the network performance and transmission rates in both families of devices due to a lack of ability of wireless devices which use differing protocols to coordinate their data transmissions. This problem is exacerbated as the number of wireless devices within the network increases and is further affected by the proximity in which the wireless devices are placed with respect to one another. Thus, in order to prevent undue network performance degradation, a compensation scheme must be devised to facilitate the coexistence of shared frequency network topologies such as those used by BT and WLAN protocols.

The widespread acceptance of both the Bluetooth and WLAN wireless protocols has further lead to the manufacture of a large number of electronic devices which typically incorporate only a single wireless technology or protocol for network communication. This creates an additional problem as there are many existing wireless networks which necessarily dictate the type of wireless protocol which can be used within the network or in the vicinity of those devices in the network. Wireless devices which do not comply with the protocol of the existing wireless network may be incompatible with the network and may be precluded from use. Thus, a user may be denied access to wireless devices which cannot be integrated into the existing wireless network infrastructure because of conflicting wireless standards. In the absence of a unifying device which permits the use of more than one wireless standard in the same service area, existing wireless devices in the network may be required to be replaced with updated devices which are capable of communicating using multiple wireless standards to prevent timing and data collisions. Clearly, device replacement in this manner is undesirable as it may be prohibitively expensive and preclude the use of wireless devices which operate with differing frequency-overlapping protocols.

Currently, coexistive methods and mechanisms are difficult to implement due to the requirement of using a wired back haul device or a dual mode radio with a special protocol. Additionally, interference and transmission collision between frequency competing protocols can be significant, and, therefore, coexistive systems are not easily implemented in current wireless local area networks that utilize a plurality of protocols. For example, a current collision avoidance method reduces collision interference by isolating competing protocols into separately designated access areas. Although isolating frequency-overlapping protocols may reduce collision interference, the convenience of using the wireless network access area diminishes due to a reduced wireless network transmission range.

Based on the foregoing, a need exists for a system to facilitate the coexistence of wireless devices which operate with different frequency-overlapping protocols such as the Bluetooth and WLAN wireless protocols. A desirable feature of such a system is to permit the use of existing wireless devices without substantial modification. Furthermore, this system should manage cross-protocol trafficking to reduce collisions and interference between the wireless protocols using mixed topologies so as to permit wireless devices with differing protocols to function within the same transmission area.

SUMMARY OF THE INVENTION

In one embodiment, the aforementioned needs may be satisfied by a signal separation device for a wireless communication network in which information exchange protocols comprising a first protocol and a second protocol are used to transmit data using a plurality of frequency-overlapping signals. In one aspect, the signal separation device may comprise a monitoring module, which receives the plurality of frequency-overlapping signals and an assessment module, which analyzes the plurality of frequency-overlapping signals and identifies a collision signal indicative of collisions between the first and second protocols. In addition, the signal separation device may further comprise a resolution module, which extracts the data from the collision signal based upon comparisons with a plurality of predicted waveforms obtained by modeling frequency-overlapping signal combinations of the first and second protocol.

Additionally, the signal separation device may further comprise a transmission module, which re-transmits at least a portion of the extracted data using at least one of the frequency-overlapping protocols to the wireless communication network. The resolution module may model the predicted waveforms using a bit combination pattern which is compared to the collision signal to identify bitwise information contained in the first and the second protocols. The resolution module may utilize a direct resolution scheme in which one or more modeled waveforms are compared to the collision signal to identify waveform components resultant from the first and the second protocol. The resolution module may utilize a time domain identification schema to determine the transmitted data resultant from the first and the second protocol. The resolution module may perform a waveform matching analysis to identify component parts of the collision signal resulting from the first and the second protocol. The resolution module may perform a distance pattern matching analysis to identify component parts of the collision signal resulting from the first and the second protocol. The resolution module may perform pattern recognition analysis to identify component parts of the collision signal resulting from the first and the second protocol.

In one aspect, the information exchange protocols may comprise a frequency-hopping spread spectrum protocol, wherein the frequency-hopping spread spectrum protocol further comprises a Bluetooth protocol. The information exchange protocols may further comprise a direct-sequence spread spectrum protocol, wherein the direct-sequence spread spectrum protocol further comprises a wireless local area network protocol (WLAN). Moreover, the wireless communication network communicates with a backbone network, wherein the backbone network comprises land-based networks including Ethernet, digital subscriber line, dial-up, or plane telephone networks.

In another embodiment, the aforementioned needs may be satisfied by a wireless network collision rectification device used to resolve collisions between data exchange protocols comprising a first protocol and a second protocol which operate using overlapping communication frequencies. In one aspect, the wireless network collision rectification device may comprise a monitoring component, which receives a plurality of signal transmissions and generates a collision signal indicative of frequency-overlapping signal transmissions between the first and second protocols and a modeling component, which accepts the collision signal and produces a characteristic waveform which identifies a plurality of component parts of the collision signal corresponding to the first and the second protocols. Additionally, the wireless network collision rectification device may further comprise a separation component, which isolates one or more of the plurality of component parts of the collision signal by resolution of the characteristic waveform and recovers one or more of the isolated component parts for subsequent transmission using at least one of the protocols.

In addition, the separation component may identify the plurality of component parts of the collision signal by comparison with a plurality of predicted waveforms generated by modeling combinations of component parts of the first and the second protocols. The separation component may model the predicted waveforms using a bit combination pattern which is compared to the collision signal to identify bitwise information contained in the first and the second protocols. The separation component utilizes a direct resolution scheme in which one or more modeled waveforms are compared to the collision signal to identify waveform components resultant from the first and the second protocol.

Additionally, the separation component utilizes a time domain identification scheme to determine the transmitted data resultant from the first and the second protocol, and wherein the collision signal is subdivided into sections based at least in part on the timing of the transmission. The separation component performs a component waveform matching analysis to identify component parts of the collision signal resulting from the first and the second protocol. The separation component performs a partial recognition analysis to identify component parts of the collision signal resulting from the first and the second protocol. The separation component performs pattern recognition analysis to identify component parts of the collision signal resulting from the first and the second protocol.

In still another embodiment, the aforementioned needs may be satisfied by a collision resolution device for a wireless communication network in which data is transmitted using a first protocol and a second protocol which operate with overlapping communication frequencies. In one aspect, the collision resolution device may comprise a monitoring component, which monitors the information transmissions and identifies frequency-overlapping data collisions between the first and the second protocols, wherein the collisions comprise a first component signal derived from the first protocol and a second component signal derived from the second protocol. In addition, the collision resolution device may further comprise an extraction component, which analyzes the data collisions and separates the first and second component signals.

Moreover, the collision resolution device may further comprise a transmission component, which transmits one or more of the separated component signals in a non-frequency-overlapping manner. The extraction component separates the first and second component signals by comparison with a plurality of predicted waveforms generated by modeling collisions between the first and the second protocols. The extraction component models the waveforms of the first and second component signals using a bit combination pattern which is compared to the collision signal to identify bitwise information contained in the first and the second protocols. The extraction component utilizes a direct resolution scheme in which one or more modeled waveforms are compared to the collision signal to identify waveforms of the component signals resultant from the first and the second protocol.

Additionally, the extraction component utilizes a time domain identification scheme to determine the data of the transmitted component signals resultant from the first and the second protocol. The extraction component performs a waveform matching analysis to identify the component signals of the collision signal resulting from the first and the second protocol. The extraction component performs a distance pattern matching analysis to identify component signals of the collision signal resulting from the first and the second protocol. The extraction component performs pattern recognition analysis to identify component signals of the collision signal resulting from the first and the second protocol.

In yet another embodiment, the aforementioned needs may be satisfied by a device for signal separation in a frequency-overlapping wireless communication network, wherein the transmission of at least one collision signal results from the simultaneous transmission of a first component signal transmitted using a first protocol and a second component signal transmitted using a second protocol. In one aspect, the device for signal separation may comprise a monitoring component configured to receive the transmission of at least one collision signal and a resolution component configured to separate the first and second component signals from the at least one collision signal using a partial recognition scheme. In addition, the monitoring component is further configured to re-transmit at least one of the separated component signals to the wireless communication network.

In still yet another embodiment, the aforementioned needs may be satisfied by a method for signal separation in a frequency-overlapping wireless communication network, wherein conflicting signal transmissions generate collision signals indicative of the simultaneous transmission of a first component signal transmitted using a first protocol and a second component signal transmitted using a second protocol. In one aspect, the method for signal separation may comprise receiving at least one of the collision signals and resolving the first and second component signals from the at least one received collision signal. Additionally, the method for signal separation may further comprise re-transmitting at least one of the component signals with altered transmission characteristics such that the component signal is re-transmitted without conflict.

In still yet another embodiment, the aforementioned needs may be satisfied by a method for collision rectification in a wireless communication network wherein a first protocol and a second protocol are used to transmit a plurality of data exchange signals including at least one collision signal indicative of a combination of frequency-overlapping data exchange signals transmitted by the first and second protocols. In one aspect, the method may comprise receiving the collision signal, analyzing the collision signal to identify the combination of the frequency-overlapping data exchange signals transmitted by the first and the second protocols, and resolving the collision signal into a first data exchange signal component and a second data exchange component resultant from the first and the second protocols. In addition, the method for collision rectification may further comprise re-transmitting at least one of the data components such that the transmitted data component is sent without frequency-overlap.

In still yet another embodiment, the aforementioned needs may be satisfied by a method for signal separation in a wireless communication network, wherein data exchange protocols comprising a first protocol and a second protocol operate using overlapping communication frequencies. In one aspect, the method may comprise receiving a plurality of wireless frequency-overlapping signal transmissions using at least one of the protocols and identifying a collision signal indicative of frequency-overlapping signal transmissions between the first and second protocols. Moreover, the method may further comprise resolving the collision signal to produce a characteristic waveform corresponding to components parts of the collision signal contributed by the first and the second protocol and recovering the component parts from the characteristic waveform, wherein the method for signal separation further comprises re-transmitting in at least one of the protocols. In another aspect, the collision signal may be resolved by modeling the predicted waveform produced by simultaneous transmission of the first data signal and the second data signal using a bit combination pattern which is subsequently compared to the collision signal to identify bitwise information contained in the first and the second protocols.

In still yet another embodiment, the aforementioned needs may be satisfied by a method for signal separation in a wireless communication network in which a first protocol and a second protocol are used to transmit data in a frequency-overlapping manner. In one aspect, the method may comprise monitoring the transmission of data by the first and the second protocols, identifying regions of timing and frequency overlap in the transmission of data, receiving the transmitted data corresponding to the regions of timing and frequency overlap, and separating the transmitted data into a plurality of data components associated with the first and the second protocols.

In still yet another embodiment, the aforementioned needs may be satisfied by a method for signal separation in a wireless communication network, wherein data exchange protocols comprising a first protocol and a second protocol operate using overlapping communication frequencies. In one aspect, the method may comprise receiving a plurality of frequency-overlapping transmissions containing conflicting data packets having component parts from the first and the second protocols, generating one or more modeled collision signals which identify the component parts of the conflicting data packets, and resolving the component parts of the conflicting data packets from the one or more modeled collision signals to form one or more resolved data packets.

These and other objects and advantages of the present invention will become more fully apparent from the following description taken in conjunction with the accompanying drawings.

BRIEF DESCRIPTION OF THE DRAWINGS

These and other aspects, advantages, and novel features of the invention will become apparent upon reading the following detailed description and upon reference to the accompanying drawings. In the drawings, same elements have the same reference numerals in which.

DETAILED DESCRIPTION OF THE PREFERRED EMBODIMENT

Although the following description exemplifies one embodiment of the present invention, it should be understood that various omissions, substitutions, and changes in the form of the detail of the apparatus, system, and method as illustrated as well as the uses thereof, may be made by those skilled in the art, without departing from the scope of the present invention. Consequently, the scope of the present invention should not be limited to the disclosed embodiments, but should be defined by the appended claims.

Figure 1A:
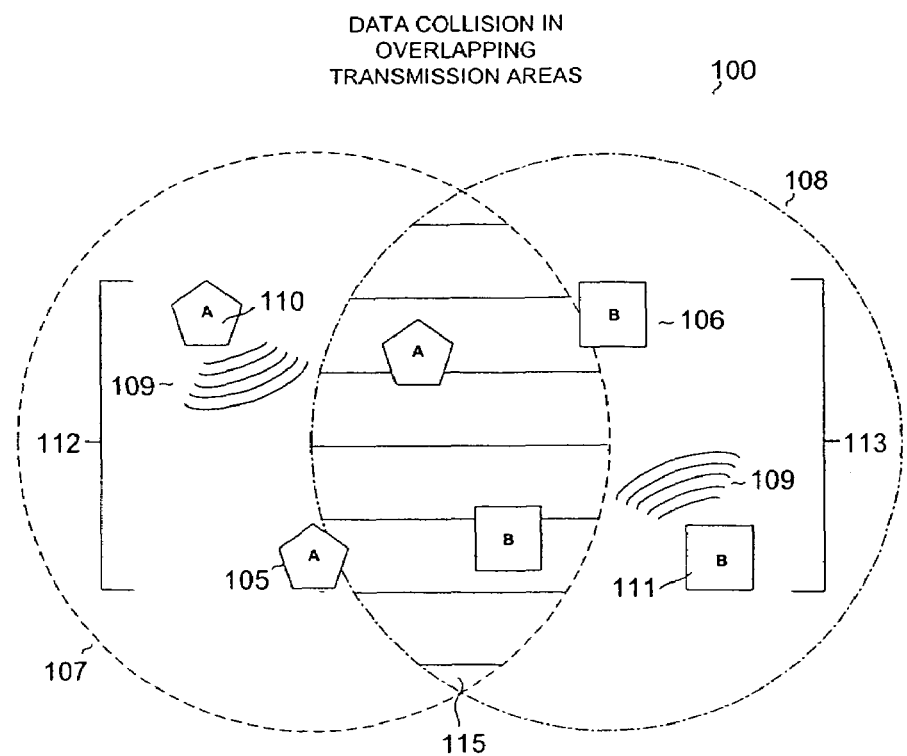
FIG. 1A illustrates a wireless network with overlapping transmission areas.

Reference will now be made to the drawings wherein like numerals refer to like parts throughout. FIG. 1A illustrates one embodiment of a wireless network 100. A plurality of wireless communication devices or data transfer terminals 105, 106 operate within one or more access areas 107, 108. Each access area 107, 108 is further characterized by a wireless signal reception radius. The signals 109 produced by the wireless communication devices 105, 106 may be received by other wireless communication devices 105, 106 within the same access area 107, 108. In addition, the wireless communication devices 105, 106 further utilize a plurality of wireless communication protocols 110, 111, and the communication devices 105, 106 within the same access area 107, 108 communicate with other communication devices 105, 106 that operate using the same communication protocol 110, 111. In one embodiment, the wireless communication devices 105, 106 utilize a Bluetooth (BT) wireless communication protocol and a Wireless Local Area Network (WLAN) wireless communication protocol in the wireless network 100.

As shown in the illustrated embodiment, the plurality of communication devices 105, 106 further comprises a first subset 112 of one or more communication devices 105, 106, which operate using a first wireless protocol 110, such as the BT wireless communication protocol, and a second subset 113 of one or more communication devices 105, 106, which operate using a second wireless protocol 111, such as the WLAN wireless communication protocol. The nature of the wireless communication protocols 110, 111 is such that at least a portion of the wireless communication protocols 110, 111 operate in a portion of the electromagnetic spectrum.

As is shown in the illustrated embodiment, an interference region 115 may occur in each access area 107, 108, where transmissions made using the first frequency-overlapping protocol 110 coexist with transmissions made using the second frequency-overlapping protocol 111. As previously discussed, use of frequency-overlapping protocols may result in collision or interference when the protocols 110, 111 operate within the same vicinity of one another. In one aspect, frequency-overlapping communication signals may produce a collision signal. A collision signal is a signal in which a plurality of communication signals overlap in time and/or frequency, and the collision signal may appear as a signal with modulated noise, a distortion signal, or an error laden signal to the receiving communication device 105, 106.

It will be appreciated that although the access areas 107, 108 illustrated in FIG. 1A are shown to partially overlap, the access areas 107, 108 may wholly overlap. The communication devices 105, 106, that may use one or more frequency-overlapping protocols 110, 111, are positioned in proximity to one another such that the access area for the frequency-overlapping protocols exists in the same spatial locality (i.e. access areas defined by identical or concentric spatial regions). It will be further appreciated that the communication devices 105, 106 may be positioned within the access areas 107, 108 such that only a portion of the devices 105, 106 reside in the interference region 115 where the communication protocols 110, 111 overlap. The presence, however, of any communication device 105, 106 within the region of overlap is sufficient for creating interference and collisions between the frequency-overlapping protocols 110, 111.

Figure 1B:
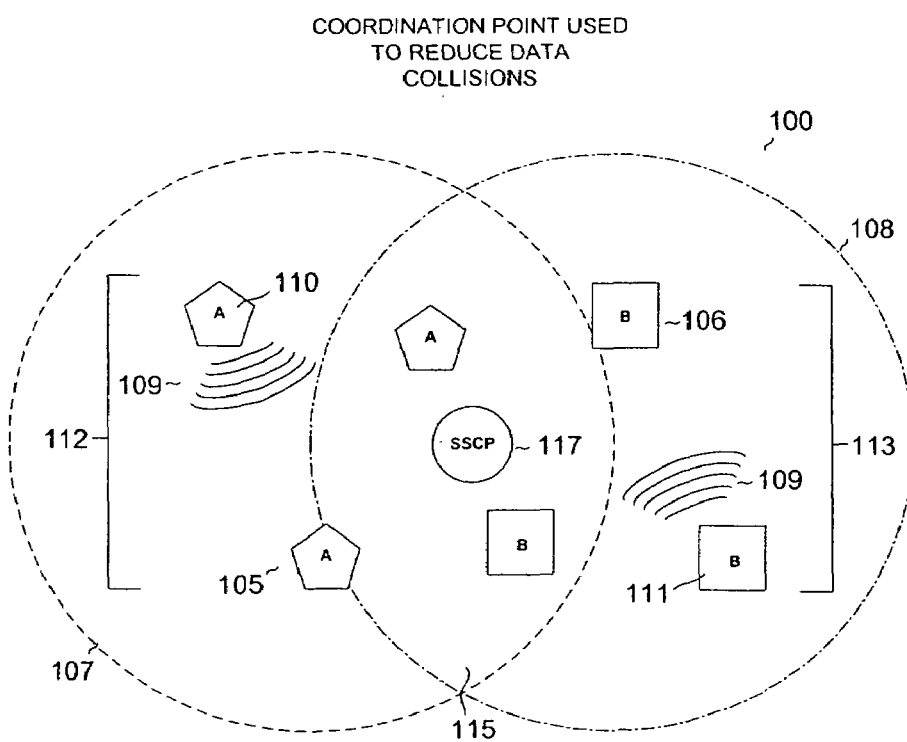
FIG. 1B illustrates the wireless network integrating a signal separation control point device.

FIG. 1B illustrates one embodiment of the wireless network 100 integrating a data collision rectification device or signal separation control point (SSCP) device 117, which permits the coexistence of the wireless network 100 with frequency-overlapping protocols 110, 111. In the illustrated embodiment, the SSCP device 117 is positioned within the interference region 115 between the two access areas 107, 108. Additionally, the SSCP device 117 serves as a moderator for at least one of the frequency-overlapping protocols 110, 111 to permit uncorrupted data transmissions in the overlying access areas 107, 108 such that collisions and interference between the first 110 and the second 111 frequency-overlapping protocols are reduced. Furthermore, the SSCP device 117 has the capability of monitoring communication signals 109 and maintaining quality of service parameters for at least one of the protocols 110, 111 in a manner that will be discussed in greater detail herein below.

In one aspect, the SSCP device 117 may be implemented as an independent device, which possesses necessary functionality to monitor and manage wireless communication signals 109 in at least one of the frequency-overlapping protocols 110, 111. One desirable feature of the independent SSCP device 117 is that it may be conveniently positioned within an existing wireless communications network 100, where data collisions and interference occur, to improve data exchange and throughput in the wireless network 100. In one embodiment, the independent SSCP device 117 moderates communication signals 109 between the frequency-overlapping wireless protocols 110, 111 in a manner, which does not require other communication devices 105, 106 within the network 100 to be modified, repositioned, or replaced. As a result, the independent SSCP device 117 reduces potential costs associated with modifying, repositioning, or replacing existing wireless devices 105, 106 with dual functionality wireless devices. It will be appreciated that this feature of the SSCP device 117 increases the flexibility, functionality, and stability of the wireless network 100 and associated wireless communication devices 105, 106.

Moreover, it will further be appreciated that, although the SSCP device 117 is shown positioned in the interference region 109 of the access areas 107, 108, the SSCP device 117 may also be positioned elsewhere within the access areas 107, 108. For example, the SSCP device 117 may be positioned within the first access area 107 to moderate the first subset 112 of wireless devices 105, which are associated with the first frequency-overlapping protocol 110. In this particular situation, network traffic flow may be improved by controlling the wireless communication signals of the first subset 112 of wireless devices 105, 106, whose data transfer activities are monitored and managed by the SSCP device 117 to reduce conflicting signal transmission interference with the second subset 113 of wireless devices 105, 106, whose data transfer activities are not moderated by the SSCP device 117.

Figure 2:
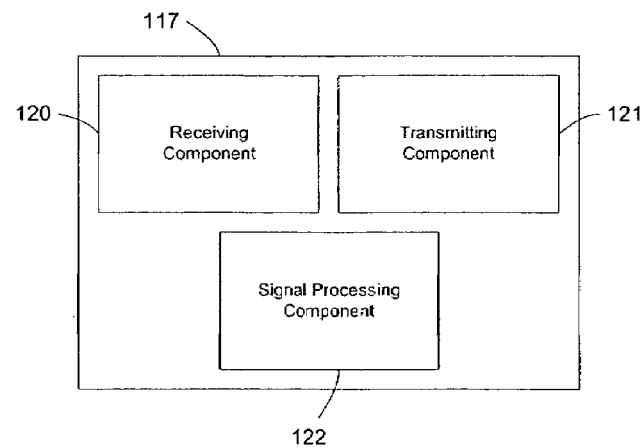
FIG. 2 illustrates one embodiment of the signal separation control point device.

FIG. 2 illustrates a block diagram of the SSCP device 117 architecture utilized to monitor, moderate, and/or coordinate wireless communication signals 109 in the wireless network 100. The SSCP device 117 comprises a receiving component 120, a transmitting component 121, and a signal processing component 122. The components 120, 121, 122 are configured to work independent of the wireless network devices 105 and to monitor, moderate, and/or coordinate the wireless frequency-overlapping communication signals 109, which utilize the frequency-overlapping protocols 110, 111 in the wireless communication network 100.

In one embodiment, the receiving component 120 is configured to listen to the wireless network 100, monitor the wireless communication traffic in the wireless network 100, and receive communication signals 109 including conflicting and/or collision signals where the frequency-overlapping protocols 110, 111 are in use. It should be appreciated that collision signals may result from the simultaneous transmission of at least two frequency-overlapping communication signals that share the same temporal region and/or frequency channel. It should also be appreciated that collision signals may occur in interference regions where the reception radius of one frequency-overlapping wireless communication protocol overlaps the reception radius of another frequency-overlapping wireless communication protocol. In one aspect, communication signals 109 may comprise data packets, which provide the medium for data exchange between the wireless communication devices 105, 106. For explanative purposes disclosed herein, the data packet may also be referred to as a component signal, which, like the data packet, comprises data and information.

In addition, the receiving component 120 may comprise dual functionality including the capability to receive and demodulate/decode WLAN and BT data packets. In addition, the receiving component 120 has a further capability to provide the signal processing component 122 with the received and demodulated/decoded WLAN and BT data and information. Moreover, the receiving component 120 is equipped with the capability to receive a collision signal and/or a plurality thereof, which will be discussed in greater detail herein below with reference to FIGS. 3A-3C.

The IEEE 802.11 medium access control (MAC) provides functionality for a reliable mechanism capable of transmitting data over a wireless communication medium. In one aspect, data is framed into a packet, and the packet includes a header file. A typical wireless transmission header comprises information that includes data packet transmission characteristics, such as the packet data rate, the packet length, the packet timing, and the packet transmission frequency. The data packet characteristics are used by the signal processing component 122 to prioritize packet transmissions within the wireless network 100. The signal processing component 122 further utilizes the data packet characteristics to determine if a collision is imminent or likely to occur. In one aspect, if it is determined that a collision between the frequency-overlapping protocols 110, 111 is imminent or likely to occur, then the signal processing component 122 commands the receiving component to receive the collision signal and then proceeds to separate the collision signal into component signals. This process will be further discussed in greater detail herein below with reference to FIG. 4.

In one embodiment, the transmitting component 121 may be configured to transmit data packets in at least one of the frequency-overlapping protocols 110, 111. In one aspect, the transmitting component 121 has single functionality including the capability to modulate/encode and transmit either WLAN or BT packets within the access areas 107, 108. In another aspect, the transmitting component 121 has dual functionality including the capability to modulate/encode and transmit WLAN and BT packets within the access areas 107, 108 including the interference region 115. The transmitting component 121 may be further equipped with the capability of accepting commands and transmission data from the signal processing component 122.

In one embodiment, the signal processing component 122 may be configured to control the receiving component 120 and the transmitting component 121. In addition, the signal processing component 122 may be further configured to formulate transmission traffic coordination decisions based on pre-determined criteria. The signal processing component 122 accepts the decoded data from the receiving component 120, determines the transmission protocol type, and extracts header information that was present in the data transmission of the received wireless transmission.

Additionally, the signal processing component 122 may comprise the capability to schedule the communication signals 109 in the wireless network 100 to reduce collisions between frequency-overlapping protocols 110, 111 in a manner as described in the Applicant's co-pending U.S. patent application entitled "TOP-LEVEL CONTROLLER FOR WIRELESS COMMUNICATION DEVICES AND PROTOCOLS", which is hereby incorporated by reference in its entirety.

The coordination of data transmissions in access areas, such as access areas 107, 108, allows for the coexistence of a plurality of frequency-overlapping protocols 110, 111, such as WLAN and BT protocols. In this particular embodiment, the signal processing component 122 comprises the capability to separate collision signals into component signals, where the component signals are representative of communication signals 109 derived using the frequency-overlapping protocols 110, 111. Furthermore, the signal processing component 122 also comprises the capability to coordinate the re-transmission of the separated component signals by managing the priority status of the separated component signals and then transferring the separated component signals to the transmitting component 121 for re-transmission to the wireless network 100.

The SSCP device 117 may be deployed in a multiple station access area in a wireless network similar to the wireless network 100. In one aspect, the SSCP device 117 may comprise a modified Bluetooth unit and a modified WLAN unit, where at least one of the units may be configured to receive collision signals and then separate the collision signals into signal components. The SSCP device 117 may be positioned among standard wireless communication devices in a wireless network, where the heaviest transmission traffic is likely to occur such as the interference region 115. The advantage of this network architecture is that the pre-existing wireless communication devices 105, 106 in the wireless network 100 may remain unchanged and unmodified. Through the use and addition of at least one SSCP device 117 in the wireless network 100, an improvement in wireless transmission performance and throughput may be achieved due to the re-transmission of separated component signals.

Figure 3A:
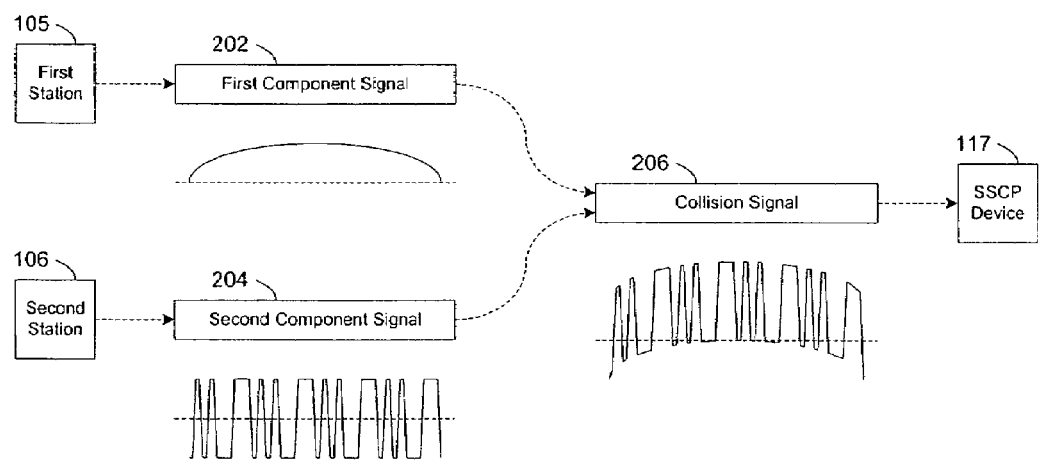
FIG. 3A illustrates one embodiment of a collision signal.

FIG. 3A illustrates one embodiment of a collision signal 206. The collision signal 206 comprises a first component signal 202 derived from a first wireless communication device 105 using a first frequency-overlapping protocol 110 and a second component signal 204 derived from a second wireless communication device 106 using a second frequency-overlapping protocol 111. As illustrated in FIG. 3A, the collision signal 206 may comprise data packets or component signals 202, 204 from a WLAN protocol and a BT protocol. It should be appreciated that the collision signal 206 may comprise component signals from the same protocol or some other wireless communication protocol. For illustrative purposes, the embodiment mentioned herein discloses the collision signal 206 comprising a first and second component signal 202, 204. It should also be appreciated that the collision signal 206 may comprise one or more component signals without departing from the scope of the present invention.

Figure 3B:
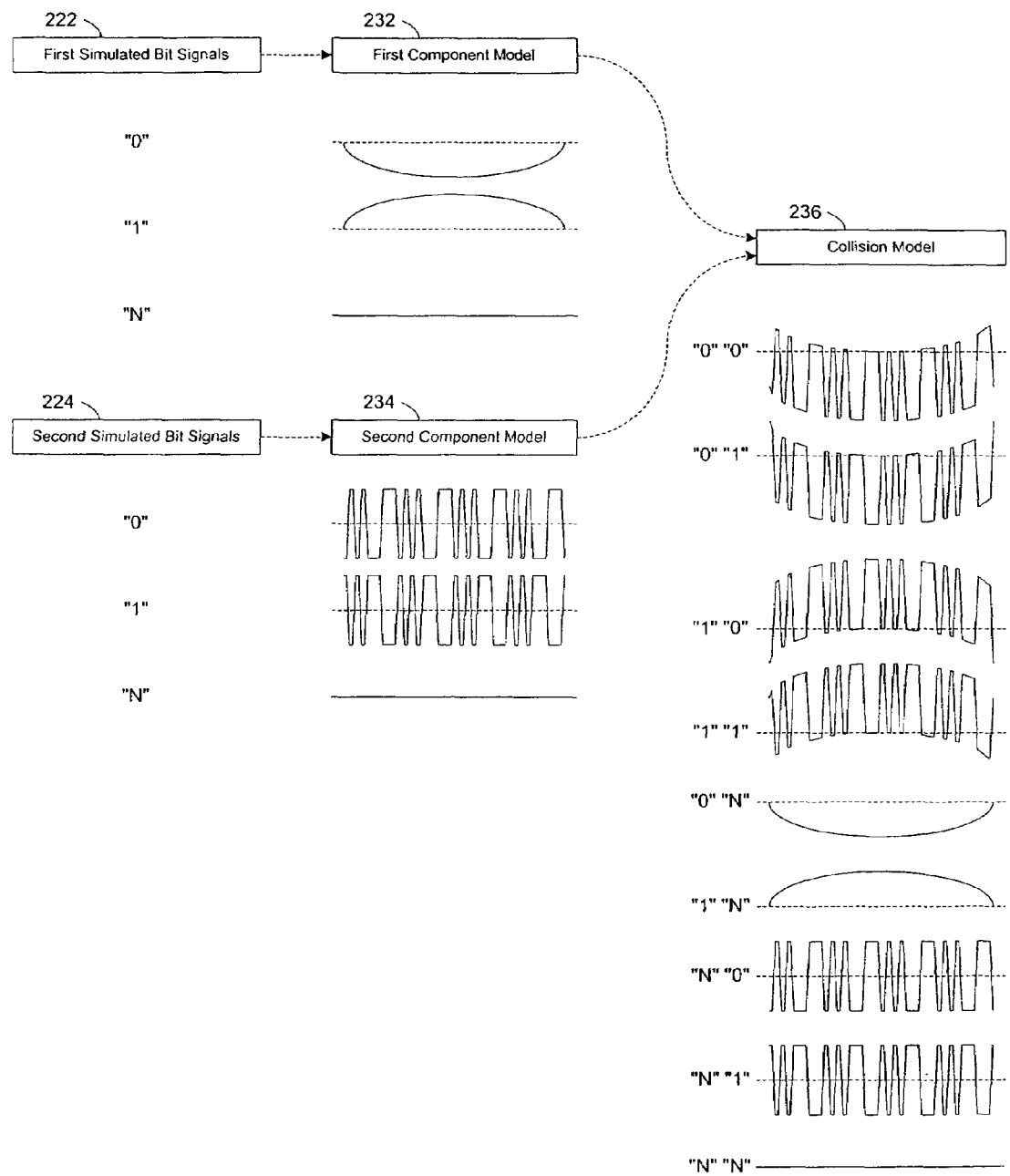
FIG. 3B illustrates one embodiment of a collision model.

In one aspect, the signal processing component 122 may be configured to recover the carrier information and the symbol timing information from the WLAN packet 202 and the BT packet 204. This information may be utilized to synchronize the simulation of a collision model as illustrated in FIG. 3B, which will be discussed in greater detail herein below. A symbol is usually defined as a block of bits, wherein a symbol may represent a block of two or more bits in a non-divisible waveform. In some cases, a symbol may comprise one bit. For example, in a generally known QAM (quadrature amplitude modulation) modulation scheme, a symbol is a waveform which may include one to four magnitude levels each lasting a symbol time. The waveform in a symbol time carries two bits, and the four magnitude levels may indicate a bit block represented by 00, 01, 10, 11. Under certain circumstances, a symbol waveform may not be incised into smaller component waveforms while still retaining the ability to identify the bits that are carried on the smaller component waveforms. For ease of processing, several symbols may be combined into a larger symbol.

FIG. 3B illustrates one embodiment of a collision model 236. In this particular embodiment, the collision model 236 may be derived from a first component model 232 and a second component model 234. The first and second component models 232, 234 may be recognized from the collision signal 206 using a first plurality of simulated bit signals 222 and a second plurality of simulated bit signals 224. In one aspect, a waveform matching analysis for comparison may be used to identify the component parts or component signals of the collision signal. For illustrative purposes, the symbol timing of the component signals 202, 204 and the component models 232, 234 are within the same temporal region and direct resolution is used for aligned symbol timing as described in FIGS. 3B, 3C. Alternatively, the implementation of partial recognition for offset symbol timing of the component signals 202, 204 and the component models 232, 234 and the method of separating the collision signal into its component signals will be discussed in greater detail herein below in FIGS. 5A, 5B.

In one aspect, the first component model 232 may be derived from the first plurality of simulated bit signals 222 using the header file and timing characteristics of the first frequency-overlapping protocol 110, and the second component model 234 may be derived from the second plurality of simulated information bits 224 using the header characteristics and timing characteristics of the second frequency-overlapping protocol 111. The first and second plurality of simulated bit signals 222, 224 represent the input to the first and second component models 232, 234, respectively.

As illustrated in FIG. 3B for this particular embodiment, the collision model 236 comprises component model signals 232, 234 from a WLAN protocol and a BT protocol. It should be appreciated that the collision model 236 may comprise component model signals from the same protocol or some other wireless communication protocol depending on the protocol used to produce the component signals of the collision signal. It should also be appreciated that the collision model 236 may be compared to the received collision signal 206 using waveform matching analysis or various other recognition schemes as described herein, wherein, by using the recognition schemes, the component signals 202, 204 may be resolved from the received collision signal 206 in a manner that will be described in greater detail herein below.

As previously discussed, the SSCP device 117 acquires transmission information including timing characteristics from the header files of previously transmitted data packets or component signals using the first and second frequency-overlapping protocols 110, 111 as well as timing characteristics from data packets or component signals that are currently being transmitted. The signal processing component 122 recognizes and develops the first and second plurality of simulated bit signals 222, 224 using bit-wise timing characteristics based on the bit rate, the bit length, and the bit frequency of the first and second component signals 202, 204. In one embodiment, the signal processing component 122 may choose to recognize and develop the first and second plurality of simulated bit signals 222, 224 using symbol-wise timing characteristics based on the symbol rate, the symbol length, and the symbol frequency of the first and second component signals 202, 204. The component signals 202, 204 may be resolved in the time domain using time domain identification, which will be described in greater detail herein below.

For explanative purposes, bit-wise processing is defined to be a bit-by-bit analysis, and, in addition, symbol-wise processing is defined to symbol-by-symbol processing where a symbol may only comprise one bit. Therefore, processing a one-bit symbol is substantially similar to processing bit-wise signals. It should be appreciated that the signal processing component 122 may develop the collision model 236 for offset timing signals, where the first and second component models partially and/or wholly overlap. Depending on the header characteristics of the previously transmitted component signals, the signal processing component 122 would generate the collision model 236 indicative of a particular collision occurrence.

In one embodiment, the signal processing component 122 may generate a look-up waveform table comprising one or more pre-constructed indexed waveforms that simulate one or more discrete waveform components and/or symbol waveform components. The advantage of generating an indexed look-up table comprising pre-constructed waveforms prior to receiving the collision signal 206 is that processing time may be reduced when the signal processing component 122 compares the collision model 236 to the collision signal 206 using, for example, waveform matching analysis. It should be appreciated that the indexed look-up table and/or the collision model 236 may be generated before or after receiving the collision signal 206. In addition, it should be appreciated that one skilled in the art may use one or more bits in a symbol or any combination thereof to simulate, produce, or generate the discrete or symbol bit component signals without departing from the scope of the present invention. In some circumstances, the modeled waveforms 232, 234, 236 may require a refresh or a re-construction when the header file or timing characteristics of the collision signal 206 change, wherein the refreshed or re-constructed modeled waveforms 232, 234, 236 may be stored for later use.

Furthermore, as illustrated in FIG. 3B, the first component signal 202 may be a WLAN packet signal, and the second component signal may be a Bluetooth (BT) packet signal. In addition, the first component model 232 may be a WLAN model, and the second component model 234 may be a BT model. Moreover, the collision signal 206 may be a WLAN-BT signal, and the collision model 236 may be a WLAN-BT model. Assuming that the WLAN and BT protocols operate at the same bit rate and are bit synchronized, the WLAN-BT model may be compared to the WLAN-BT signal using one or more bits. At any bit time, the WLAN and BT bits may be either a 1, 0, or none (N), and the bit combination patterns for WLAN and BT are as follows:

0-0
0-1
1-0
1-1
N-0
N-1
0-N
1-N
N-N

In one aspect, there are nine possible bit combination patterns of the bit-wise or bit-symbol-wise signal waveforms, wherein each combination represents a bit-wise or bit-symbol-wise combination pattern. The WLAN-BT signal (collision signal 206) may be bit-wise compared to each of the bit combination patterns, wherein the bit combination patterns from the WLAN-BT model (collision model 236) that most closely resemble the bit from the WLAN-BT signal (collision signal 206) should be judged to most likely be the actual signal waveform. The resembled bit combination provides the decoded bits for both the WLAN signal (first component signal 202) and the BT signal (second component signal 204). It should be appreciated that the timing characteristics, which include the bit rate, the bit length, and the bit frequency, of the first and second component signals 202, 204 may vary, which may result in an increase in the amount of bit combination patterns needed to decode the collision signal 206. As a result, one or more bit combination patterns may be used by one skilled in the art without departing from the scope of the present invention.

It should be appreciated that the collision signals and models may comprise two or more components of the same protocol, such as BT-BT or WLAN-WLAN without departing from the scope of the present invention. It should also be appreciated that the illustrated waveforms in FIG. 3B assume the application of a fixed local carrier and a low pass filter to the received waveform for correlation. In addition, a shaping filter is not applied. Furthermore, different demodulation methods and parameter settings may produce or derive different waveforms. Also, the modeled waveforms may comprise different shapes along the time axis for different bit duration, wherein these waveforms may be constructed by a stored waveform starting from a different index point.

In one embodiment, signal recognition and development involves digital sampling and bit-wise partitioning of the transmission signal waveforms into discrete bit-wise waveform components. Subsequently, the signal processing component 122 may then analyze the discrete waveform components for the bit-wise timing characteristics including, but not limited to, the bit rate, the bit length, and the bit frequency. After sampling, partitioning, and analysis, the first and second component models 232, 234 may then be generated from digital samples of the discrete bit-wise waveform components relating to the relative bit-wise timing characteristics of the first and second protocols 110, 111. In one aspect, the modeled waveforms 232, 234, 236 may be continuously updated and/or refreshed to insure modeling reliability.

For example, in the time domain, the first and second component signals 202, 204 are analog waveforms. In comparison, the first and second component models 232, 234 are digitally simulated bit-wise analog waveforms recognized and developed from the bit-wise timing characteristics of the first and second component signals 202, 204. It should be appreciated that the model may include allowances for modulation effect, channel distortion effect, and noise, which may or may not be included partially or fully into the model. Furthermore, it should be appreciated that one skilled in the art may use one or more discrete waveform components or any combination thereof to simulate the bit-wise analog waveforms without departing from the scope of the present invention.

In another embodiment, signal recognition and development involves digital sampling and symbol-wise partitioning of the transmission signal waveforms into discrete symbol-wise waveform components. Subsequently, the signal processing component 122 may then analyze the waveform components for the symbol-wise timing characteristics including, but not limited to, the symbol rate, the symbol length, and the symbol frequency. After sampling, partitioning, and analysis, the first and second component models 232, 234 may then be generated from digital samples of the symbol-wise waveform components relating to the relative symbol-wise timing characteristics of the first and second protocols 110, 111.

Figure 3C:
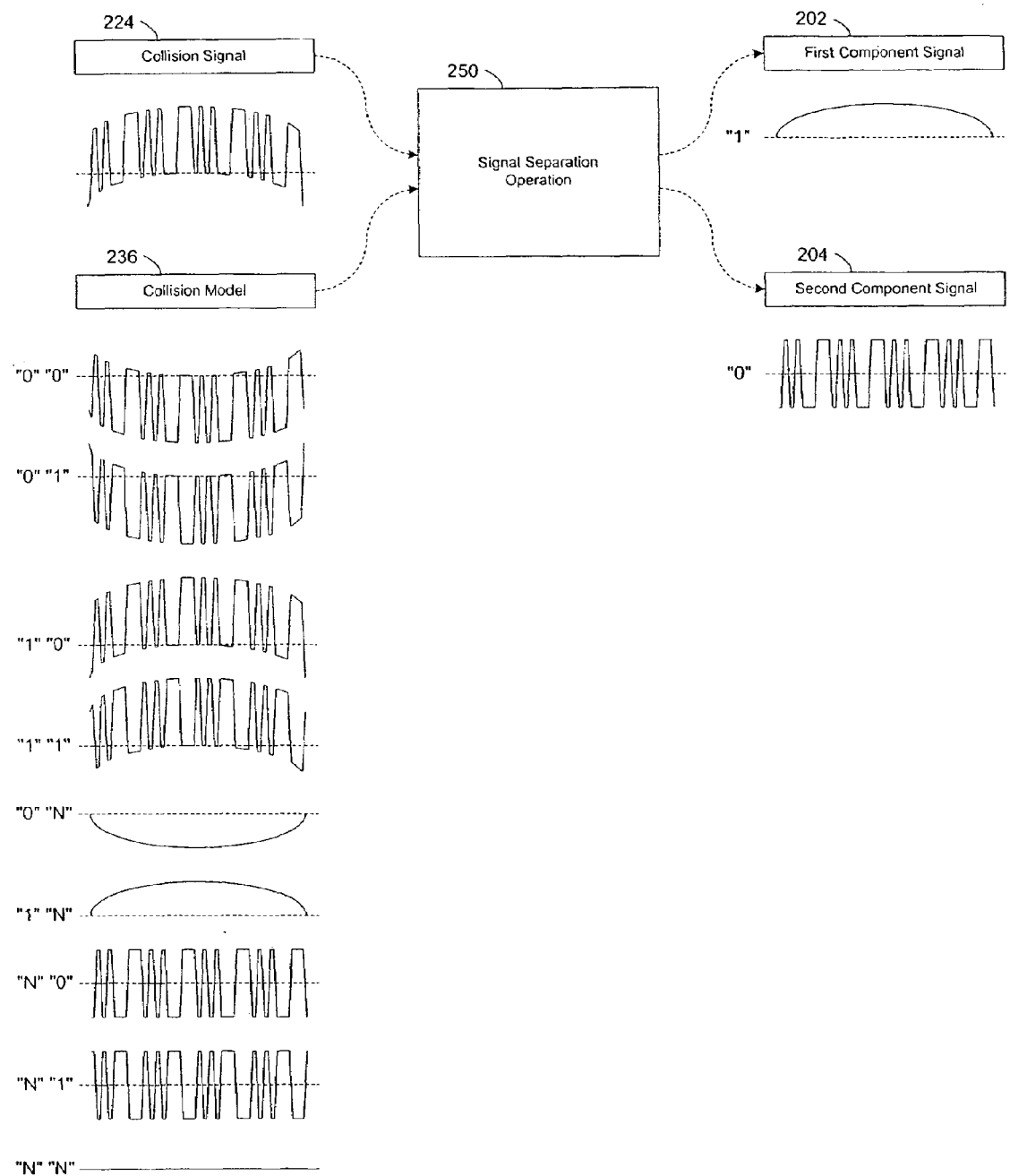
FIG. 3C illustrates one embodiment of a signal separation operation.

For illustrative purposes, the bit-wise procedure is used to explain the following process, but it should be understood that the symbol-wise procedure is similar in scope and may be applied to the following process without departing from the spirit of the present invention. FIG. 3C illustrates one embodiment of a signal separation operation 250. As a result of bit-wise signal recognition and the subsequent simulated development of discrete bit-wise waveform components, the simulated collision model 236 may be compared to the actual collision signal 206 using, in one embodiment, waveform matching analysis. When using waveform matching analysis, the signal processing component 122 compares the developed collision models 236 with the received collision signal 224. Once the signal processing component 122 determines a close match, then the signal processing component 122 separates the received collision signal 224 into its component signals 202, 204. Since the collision models 236 were developed using the component signal models 232, 234, as described in FIG. 3B, the component signals 202, 204 are known or predicted with confidence. It should be appreciated that one or more simulated bits or discrete waveform components may be used to compare the collision model 236 to the collision signal 224.

As previously discussed with reference to FIG. 2, the receiving component 120 of the SSCP device 117 is configured to receive wireless signal transmissions including collision signals, such as the collision signal 206, in the temporal region when the incidence of the collision signal 206 is imminent or likely to occur. After receiving the collision signal 206, the signal processing component 122 of the SSCP device 117 is configured to implement a recognition scheme, separate the collision signal 206 into its component signals 202, 204, and then proceed to retransmit, redirect, or send at least one of the component signals 202, 204 to other wireless communication devices, systems, or backbone networks, such as an Ethernet, a digital subscriber line, a dial-up, some sort of plane telephone network, or any combination thereof. In addition, it should be appreciated that the SSCP device 117 may or may not elect to retransmit, redirect, or send at least one of the component signals 202, 204. In one aspect, the signal processing component 122 may be configured to recover the carrier information and the symbol timing information from the WLAN packet 202 and the BT packet 204. This information may be utilized to synchronize the signal separation operation 250 that is illustrated in FIG. 3C, which will be discussed in greater detail herein below.

Figure 4:
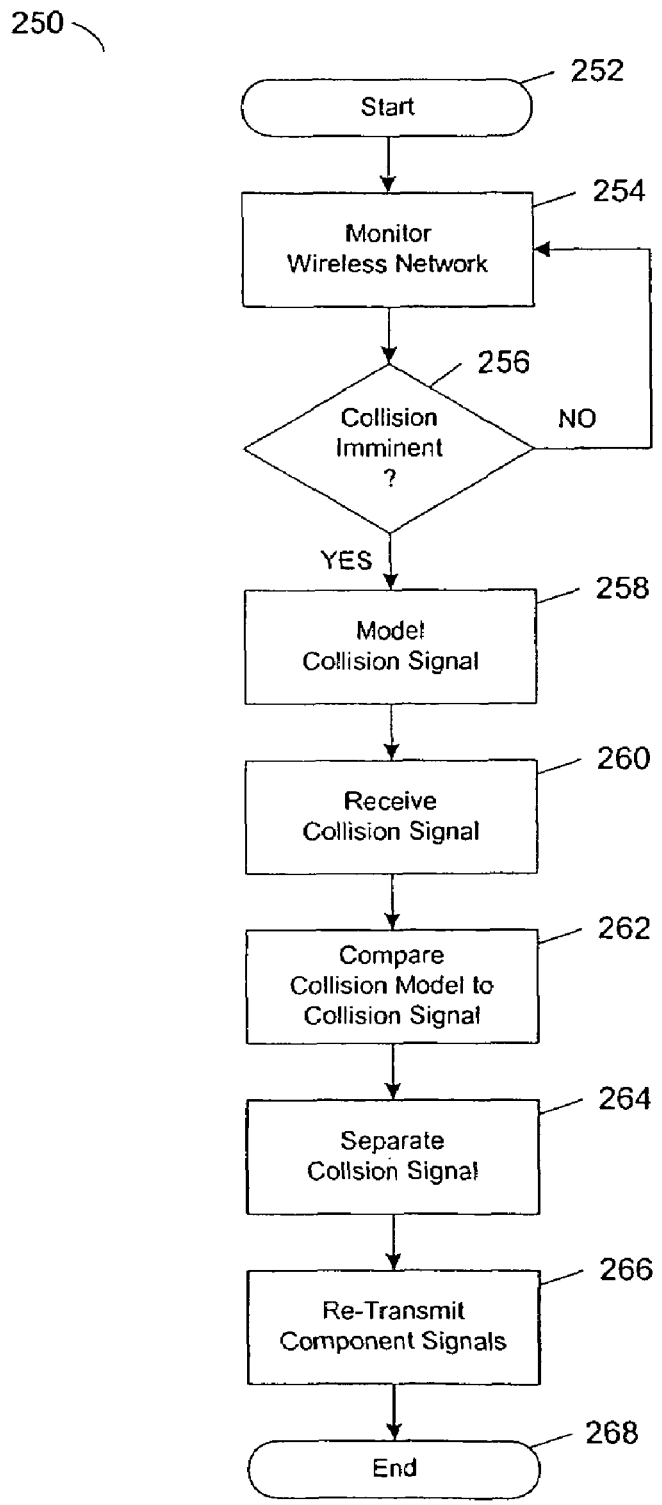
FIG. 4 illustrates one embodiment of the signal separation operation 250 with reference to FIG. 3C.

FIG. 4 illustrates one embodiment of the signal separation operation 250 with reference to FIG. 3C. The purpose of the signal separation operation 250 is to resolve the transferred bits of the first and second component signals 202, 204 from the received collision signal 206. In one aspect, the signal processing component 122 uses the signal separation operation 250 to match by comparison the modeled waveform components of the collision model 236 to the transferred waveform components of the received collision signal 224 in a probability decision based on the processing method, the channel condition, and the transmitter/receiver performance. As is illustrated in FIG. 3C, the SSCP device 117 implements the signal separation operation 250 and utilizes the generated collision model 236 to resolve the first and second component signals 202, 204 from the received collision signal 224. Advantageously, the signal separation operation 250 may be used by the SSCP device 117 in the wireless network 100 to reduce interference and data corruption resulting from the simultaneous transmission of the first and second component signals 202, 204 in the wireless network 100.

In one embodiment, the signal separation operation 250 commences in a start state 252 and initiates by monitoring the wireless network 100 in a state 254. While in the state 254, the SSCP device 117 monitors wireless transmission traffic by receiving, extracting, and analyzing transmission information on the air channel of the wireless network 100. As previously described, the transmission information includes header information, which is indicative of previously and currently transmitted characteristics of the data packets or component signals 202, 204. In one embodiment, the receiving component 120 monitors the transmission traffic by polling or "listening" to transmission information included in the wireless component signals 202, 204 transmitted by the BT and WLAN wireless devices to identify the transmission characteristics that relate to how data packets are being transmitted via the WLAN and BT stations 105, 106. The transmission characteristics may further include information such as the sequence of data packets being transmitted, the timing of the transmitted data packets, and the frequency or channel that the data packets will be transmitted on. Furthermore, the SSCP device 117 may also extract and analyze the bit-wise and/or symbol-wise timing characteristics of the component signals 202, 204.

While monitoring the transmission traffic and header characteristics of the component signals 202, 204 in the state 254, the signal separation operation 250 advances to a state 156. In the state 156, the signal processing component 122 determines if a collision between the frequency-overlapping protocols 110, 111 is imminent or likely to occur. If the data packet collision on the air channel in the wireless network 100 is not likely to occur, then the signal processing component 122 does not proceed to interrupt or moderate the data packet transmission traffic and permits the BT wireless devices and the WLAN wireless devices to transmit information without moderation. As a result, the signal processing component 122 proceeds to continue monitoring the wireless network transmissions in the state 154.

If, however, a data packet collision or protocol interference is likely to occur, the signal processing component 122 proceeds to another state 258 to begin modeling the component signals 202, 204. Using methods as previously described with reference to FIG. 3B, the SSCP device 117 generates the collision model 236, including the first and second component models 232, 234, which may be utilized to substantially circumvent data collisions and/or inhibit interference between the WLAN and BT frequency overlapping protocols 110, 111. In one embodiment, the SSCP device 117 may accomplish this task by utilizing the signal separation operation 250, as illustrated in FIG. 3C, to recognize the bit-wise or symbol-wise signal components of one or more protocols. Recognition schemes are utilized to recover and/or resolve the first and second component signals 202, 204 when the collision signal 206 is produced in the wireless network 100. A plurality of recognition schemes that may be used will be discussed in greater detail herein below. In one embodiment, the signal processing component 122 may generate a look-up waveform table comprising one or more indexed waveforms that simulate one or more discrete waveform components.

It should be appreciated that, in the evolution of various wireless network communication protocols, the integration of transmission traffic monitoring with the signal moderation produces a flexible yet powerful method of insuring compatibility and stability among a plurality of frequency-overlapping wireless communication devices in a wireless network. The addition of a centralized signal separation device in a wireless communication network may improve data throughput, prevent undesirable data corruption, and deter network latency. Moderation of frequency-overlapping protocols using the herein described wireless traffic signal separation device, system, functions, and methods permits the use of various classes of wireless communication devices, which were until now incompatible with one another.

After generating the component models 232, 234 and the collision model 236 in the state 258, the signal separation operation advances to a state 260. In the state 260, the SSCP device 117 receives the sensed collision signal 206 from the air channel of the wireless network 100. In one embodiment, from the header characteristics of the previously transmitted component signals, the SSCP device 117 may determine the temporal region that coincides with the timing of the collision signal 206 to thereby receive and capture the collision signal 206. Once captured, the signal processing component 122 may then sample and digitize the received the analog waveform of the collision signal 206 for the subsequent comparison via the signal separation operation 250 in a proceeding state 262. In the state 262, the signal processing component 122 compares the generated waveform of the collision model 236 to the captured analog waveform of the collision signal 206. It should be appreciated that the collision model 236 and the collision signal 206 may be compared bit-wise or symbol-wise, which may also be referred to as discrete component waveforms or symbolic waveforms.

In the state 264, the SSCP device 117 separates the collision signal 206 into its component signals 202, 204 by implementing one or more of a plurality of recognition schemes. The various recognition schemes that may be utilized to separate the collision signal 206 into its component signals 202, 204 will be described in greater detail herein below. Additionally, once the component signals 202, 204 have been resolved or recovered from the collision signal 206, then the signal separation operation 250 proceeds to a state 266. In the state 266, the signal processing component 122 of the SSCP device 117 may elect to retransmit, redirect, or send at least one of the resolved component signals 202, 204 via the transmitting component 121 to the wireless network 100. In one aspect, depending on the encountered situation, the signal processing component 122 may elect not to retransmit, redirect, or send the resolved component signals 202, 206. Furthermore, subsequently proceeding the state 266, the process flow of the signal separation operation 250 terminates in an end state 268.

Advantageously, the SSCP device 117 implements the above-mentioned signal separation operation 250 to resolve the first and second component signals 202, 204 from the collision signal 224, which may reduce interference and data corruption resulting from the simultaneous transmission of the first and second component signals 202, 204 in the wireless network 100. Additionally, the separation and coordination of wireless data transmissions in the access areas 107, 108 allows for the coexistence of a plurality of frequency-overlapping wireless communication protocols 110, 111, such as WLAN and BT protocols, in the wireless network 100.

In one embodiment, the recognition schemes that may be utilized by the signal processing component 122 of the SSCP device 117 may comprise, but are not limited to, direct recognition schemes, transformed domain schemes, wavelet schemes, partial recognition schemes, and/or some combination thereof. The signal processing component 122 may resolve the component signals 202, 204 from the collision signal 206 by utilizing direct resolution and time domain schemes including simple matching and/or mutual distance pattern matching in which one or more modeled waveforms are compared to the collision signal 206 to identify waveform components resultant from the first and the second protocol 110, 111. As previously described in FIGS. 3A-3C, the direct resolution scheme directly compares bit-wise and/or symbol-wise components at their relative bit time signature, and the decision making directly produces the recovered bits in the frequency-overlapping channels.

Additionally, the signal processing component 122 may also resolve the component signals 202, 204 from the collision signal 206 by utilizing time domain identification to determine the transmitted data resultant from the first and the second protocol 110, 111. Assuming that the bit-wise symbol and the bit rate are synchronized for both protocols 110, 111, the component signals may be resolved in the time domain. The distance between bit-wise components may be defined as the average distance between two time signal waveforms through the bit time. The distances may be organized and placed into a cross-check table in matrix form.

In one embodiment, distance pattern matching analysis may be performed by the SSCP device 117 to identify component parts of the collision signals. The SSCP device 117 may utilize various distance definitions to assist with evaluating the distance between bit-wise components, wherein distance definitions may be defined as the signal value difference with respect to time. Discrete sampling of the waveforms produces signal values at the time of sampling. Comparing the differences between the collision signal and modeled collision signal produces differential signal values at the points of sampling. By adding the differential signal values between the collision signal and the modeled signals, the closest match may be determined. The simple matching scheme involves calculating a distal differential between two signals, such as the collision signal 206 and the collision model 236. For example, as the distal differential between the collision signal 206 and one of the nine combination patterns of the collision model 236 approaches a zero value, the modeled combination pattern that most closely resembles the collision signal 206 is selected as the transferred waveform. Equation one may be used to calculate the distal differential, wherein the distance differential ($d_{n,m}$) between the first and second waveform is equal to the summation, from the first sample to the last sample, of the magnitudes of the first waveform (n) minus the magnitude of the second waveform (m) divided by the total number of samples:

$$d_{m,n} = \frac{\sum_{i=1}^{Ns} |f_m(i) - f_n(i)|}{Ns} \quad (1)$$

In one aspect, if there are more than one zero distance matches, then the mutual distance pattern may be utilized to further distinguish between the more than one zero distance matches. The average distal differential between the collision signal 206 and the nine combination patterns of the collision model 236 may be defined as an interested parameter, wherein the interested parameter is equal to the sum of the distal differentials between the collision signal 206 and the nine combination patterns of the collision model 236 divided by the total number of patterns, which in this case is a total of nine combination patterns. As a result, the interested parameter may then be used to assist in further distinguishing between the more than one waveforms with a zero distance match. As previously discussed, it should be apparent that one or more combination patterns may be used to model the waveform of the collision signal 206 without departing from the scope of the present invention. Therefore, there may exist one or more distal differential values corresponding to the number of combination patterns used to model the waveform of the collision signal 206. In addition, distance pattern matching analysis may further include other distance definitions to calculate the distal differential, such as the even-square distance (2) and the root-mean-square distance (3):

$$d_{m,n} = \frac{\sum_{i=1}^{Ns} |f_m(i) - f_n(i)|^2}{Ns} \quad (2)$$

$$d_{m,n} = \frac{\sqrt{\sum_{i=1}^{Ns} |f_m(i) - f_n(i)|^2}}{Ns} \quad (3)$$

The combination patterns indicative of, but not limited to, the nine signal waveforms described in FIGS. 3A-3B may be transformed into the frequency domain using, for example Fourier transforms, without departing from the scope of the present invention. In this particular embodiment, the time domain schemes as previously described still apply in the frequency domain. Wavelet transforms may also be used, wherein the signal waveforms may be classified into a series of wavelets. In addition, the signal separation may be accomplished by wavelet analysis and identification of the received waveforms. Furthermore, the signal waveforms may embody a code set derived from compression coding schemes to be transferred through the channel. In this particular embodiment, the signal separation may be thought of as a coding of the received signal, wherein the received signal may be decoded into its signal components using compression coding technologies.

Component signal recognition is one aspect of the present invention, both in time domain and frequency domain, or in any other transformed domain. The received collision signal may comprise one of a plurality of possible component signal waveform patterns, plus noise, wherein signal separation is determined by the SSCP device. In addition, a BT signal may occupy only a part of a WLAN signal bandwidth. As a result, some kinds of pre-filtering or post-filtering may be applied to the signal for better performance. One useful pre-filter is the bandpass filter used in BT receivers which allows a BT channel pass through. In this particular situation, it is possible that the WLAN signal loses most of the useful information for identifying the transferred bit such that that the BT bit may only be recovered. If only the BT bit is identifiable, then the process is called a partial recognition scheme such that only part of the information in the collision signal may be recovered. It should be appreciated that the pre-filter may be applied to both the received collision signal and the collision model. Furthermore, the algorithms used in filter designs may comprise either finite impulse response (FIR) and/or infinite impulse response (IIR) forms. The easier form should be chosen for lower implementation cost, and the stability should also be considered carefully.

In addition, other implementation considerations need to be addressed. In one aspect, the sampling rate depends on the bandwidth and central frequency of the received collision signal. In full bandwidth processing, a collision signal may occupy a wide bandwidth, such as an original WLAN signal, which is about 20 MHz. In the narrow band processing, the collision signal may occupy slightly wider than the 1 MHz BT channel band. Moreover, the signal bands may be down converted from a radio frequency (RF) band to a lower band so that a lower sampling rate may be used.

To make signal separation work more efficiently, some techniques may be used in addition to the basic techniques described above. In one aspect, to separate BT and WLAN signals, the relative powers of these two overlapping signal must be in a certain range. The receiving station may choose to signal the remote senders to change the sending signal power to meet this requirement. The power levels should be optimized for the best separation goal. If the fine control for best performance is not available, some kind of coarse control should be applied.

In high density BT environments, strategies involving lower transmission power will limit the interference to other stations to a shorter range. This should be made a policy for both BT and WLAN in addition to other power control policies. Regular power control policy in a wireless network may require that, if the receiving station did not receive the packet successfully, the sending station will raise the transmission signal power. The lowest power strategy may further require that the loss of the packet may be caused by collision or burst interference. Instead of simply raising power, the sending station should be aware the reason for packet losses, wherein the sending station should only raise power when the low power is the only solution.

In the case when a coordinative access point, such as the SSCP device 117, is close to multiple BT piconets with multiple active critical BT connections, the coordination in the coordinative access point should be able to identify these multiple BT piconets as active connections. In addition, the WLAN packet timing may be coordinated to avoid colliding with active BT connections. This is also true for other types of coordination devices. In the case that a WLAN access point (AP) is close to some BT piconets, the WLAN AP should apply the same techniques used in a coordinative access point. The timing coordination and signal separation may be implemented in other types of devices or in an independent device to benefit the surrounding wireless communication devices. The other type of devices may include the Blue Tooth MP3 player, or similar electronic devices.

Figure 5A:
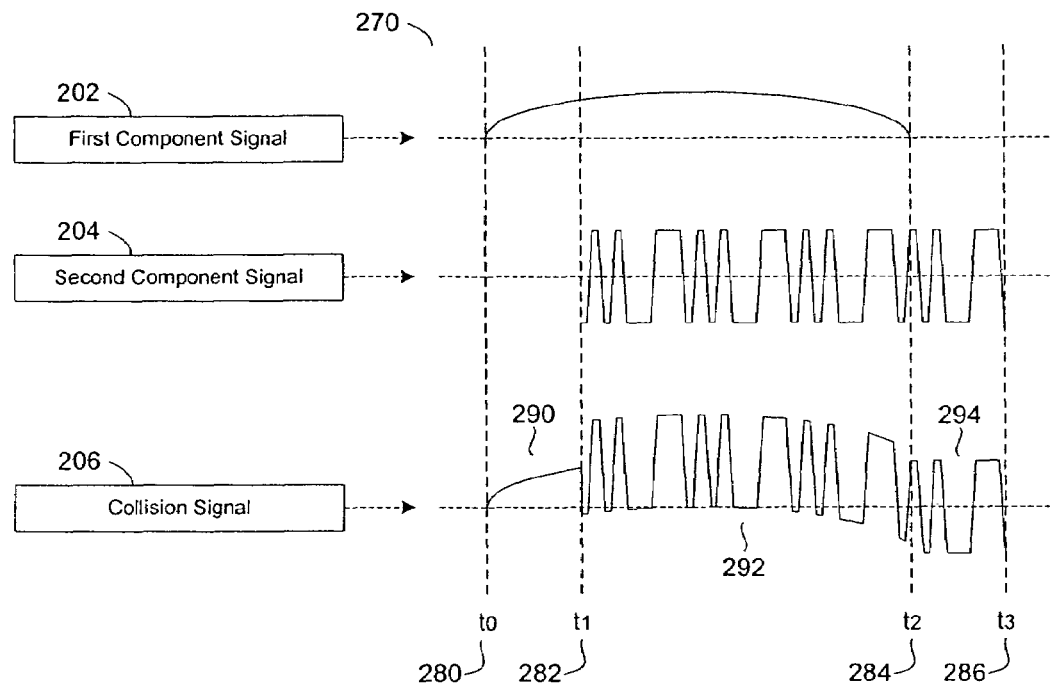
FIGS. 5A, 5B illustrate various embodiments of offset symbol timing.

FIG. 5A illustrates one embodiment of offset symbol timing in temporal region 270. For illustrative purposes, the temporal region 270 is subdivided into delineations 280, 282, 284, 286. The transmission of the first component signal 202 starts at an first delineation ($t_0$) 280 and ends at a third delineation ($t_2$) 284. Similarly, the transmission of the second component signal 204 starts at a second delineation ($t_1$) 282 and ends at a fourth delineation ($t_3$) 286. In one aspect, the simultaneous transmission of the first and second component signals 202, 204 in the same temporal region 270 create interference and produce the collision signal 206 between the first temporal region ($t_0$) 280 and the fourth temporal region ($t_3$) 286. When component signal timings are not synchronized, partial bit recognition may not be preformed in a manner as previously described.

One example of partial bit recognition is described as follows. In FIG. 5A, time starts from $t_0$ 280, wherein a bit or symbol in the first component signal, such as a WLAN component signal, initiates transmission. In time duration of $t_0$-$t_2$, the object of the SSCP device 117 is to decide what bit or symbol is carried in the first component signal 202 regardless of the bit or symbol that is carried in the second component signal 204, such as a BT component signal. In one aspect, the temporal region may be dynamically divided by the SSCP device 117 into a first time segment $t_0$-$t_1$ having a first partial signal 290 and a second time segment $t_1$-$t_2$ having a second partial signal 292. Dynamic division refers to the ability of the SSCP device 117 to pinpoint the starting position of the collision. In one embodiment, the SSCP device 117 may accomplish this by comparing digital samples of the received collision signal 206 to the first and second simulated bit signals 22, 224 as described in FIG. 3B.

The nine possible component signal waveforms as described with reference to FIGS. 3C, 3D may be reorganized as follows:

| Signal Waveform | First Component Bit | Second Component Bit |
|---|---|---|
| s1 | 0 | 0 |
| s2 | 0 | 1 |
| s3 | 1 | 0 |
| s4 | 1 | 1 |
| s5 | N | 0 |
| s6 | N | 1 |
| s7 | 0 | N |
| s8 | 1 | N |
| s9 | N | N |

In the first time segment $t_0$-$t_1$, the SSCP device 117 may decide or predict that the first partial signal 290 is in one of the three sets, wherein:

set 1: WLAN bit=0, signal waveforms: s1, s2, s7;
set 2: WLAN bit=1, signal waveforms: s3, s4, s8;
set 3: WLAN bit=N, signal waveforms: s5, s6, s7.

This will give the preliminary idea of the first component bit in time $t_0$-$t_2$. Additionally, in the second time segment $t_1$-$t_2$, the SSCP device 117 may decide or predict which set the second partial signal 292 belongs to. Furthermore, the SSCP device 117 determines whether the predictions made for the first and second partial signals 290, 292 match. If the predictions fail to match, then further processing or decisions may be made, wherein the SSCP device 117 may choose to re-predict the partial signals 290, 292 to search for a match or end the processing. The processing of decisions and predictions will be discussed in greater detail herein below with reference to FIG. 6.

The detection of the bit carried in the second component signal 204 may be predicted in a similar process. The bit time period for the second component signal 204 is in time duration $t_1$ to $t_3$, which may be subdivided into the second time segment $t_1$-$t_2$ and a third time segment $t_2$-$t_3$. A resultant prediction of the second partial signal 292 and a third partial signal 294 by the SSCP device 117 may recover the bit carried in the second component signal 204 in time duration $t_1$ to $t_3$.

Figure 5B:
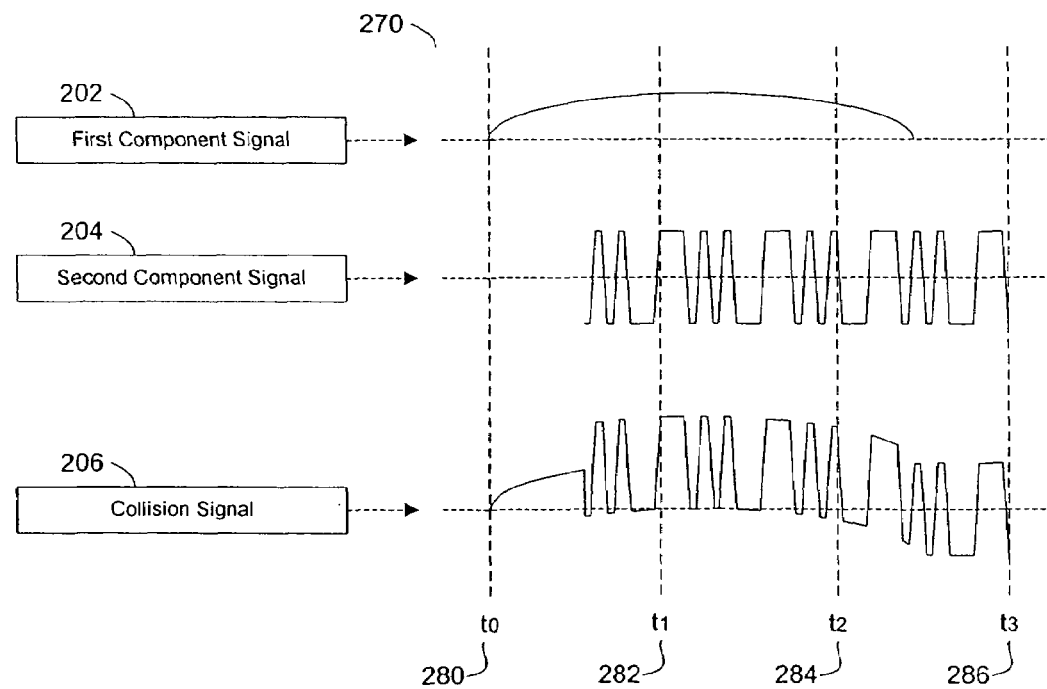

FIG. 5B illustrates another embodiment of offset symbol timing in temporal region 270. In one aspect, the temporal region may be statically divided by the SSCP device 117 into evenly spaced time segments $t_0$-$t_1$, $t_1$-$t_2$, and $t_2$-$t_3$. In this particular embodiment, bit detection and prediction may be performed by the SSCP device 117 in a similar manner as described in FIG. 5A, except that the partial signals within the time segments may require further processing and evaluation.

It should be appreciated that the partial recognition process performed herein recognizes one bit in one signal of two signals. Compared to the above-mentioned recognition process of the signal separation operation, which uses synchronized bits or symbols where two bits in two signals are recognized in one step simultaneously as described in FIGS. 3A-3C. In one aspect, the partial recognition process described herein is used by the SSCP device 117 to recognize part of the transmission information in the combined collision signal.

Figure 6:
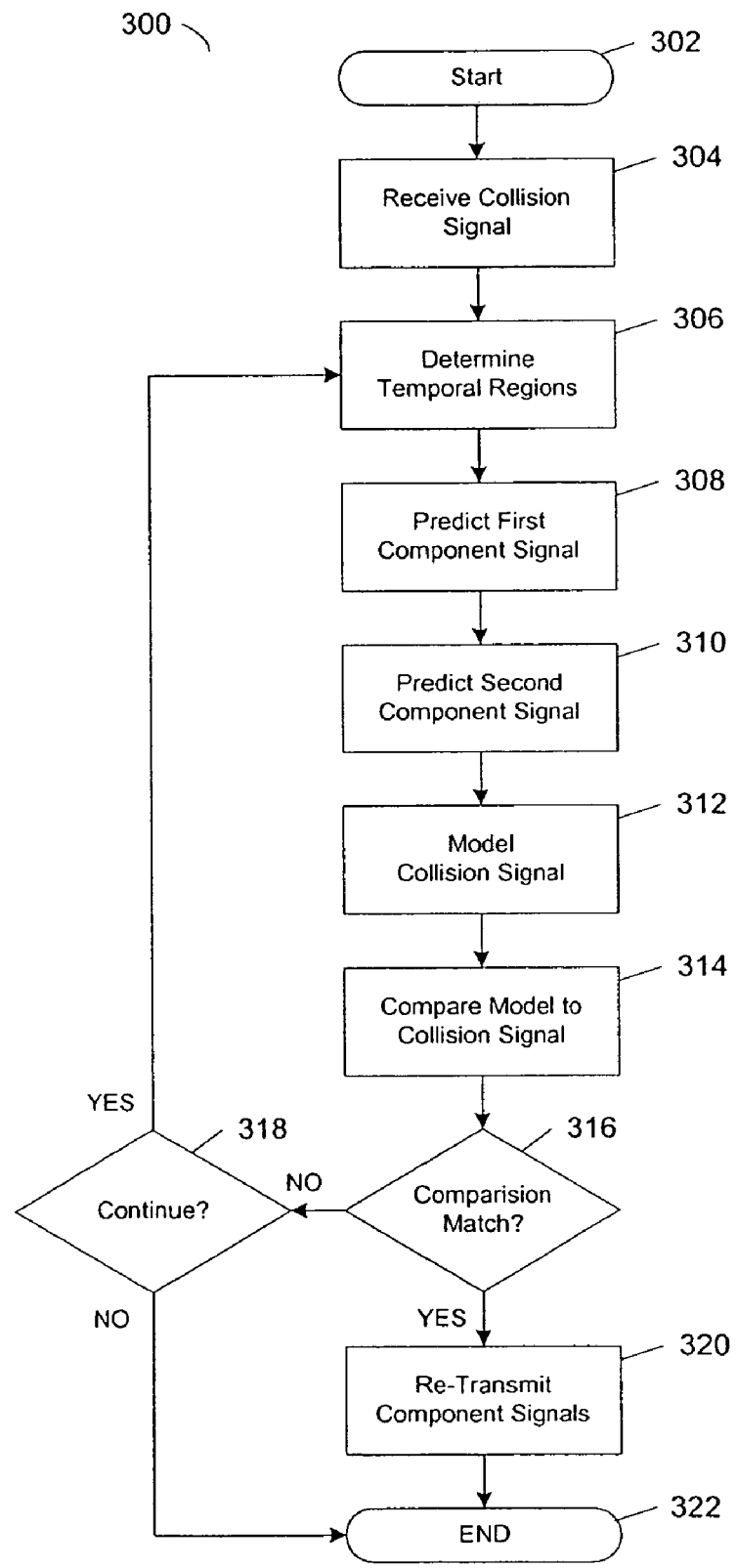
FIG. 6 illustrates one embodiment of a partial recognition process with reference to FIGS. 5A, 5B.

FIG. 6 illustrates one embodiment of a partial recognition process 300 with reference to FIGS. 5A, 5B. The purpose of the partial recognition process 300 is to independently resolve the one or more transferred bits of the first component signal 202 prior to recognizing the one or more transferred bits of the second component signal 204 or vice versa from the received collision signal 206. In one aspect, the signal processing component 122 uses the partial recognition process 300 to match by comparison the modeled waveform components of the collision model 236 to the transferred waveform components of the received collision signal 224 in a probability decision. As is illustrated in FIG. 5A, the SSCP device 117 implements the partial recognition process 300 to resolve the first and second component signals 202, 204 from the received collision signal 224. Advantageously, the partial recognition process 300 may be used by the SSCP device 117 in the wireless network 100 to reduce interference and data corruption resulting from the simultaneous transmission of the first and second component signals 202, 204 in the wireless network 100.

In one embodiment, partial recognition process 300 commences in a start state 302 and initiates by receiving a collision signal in a state 304. It should be appreciated that the SSCP device 117 may receive the collision signal via wireless or hardwired communication. The SSCP device 117 may or may not monitor the wireless network to receive the collision signal. In one aspect, the SSCP device 117 may be a signal separation component of a network device, wherein the collision signal is transferred to the signal separation component, the signal separation is performed, and then the component signals are transferred to the network device.

After receiving the collision signal in the state 304, the partial recognition process 300 advances to a state 306. In the state 306, the signal processing component 122 subdivides the temporal region 270 into one or more time segments in a manner as described in FIGS. 5A, 5B. Following the subdivision of the temporal region 270 in the state 306, the signal processing component 122 determines or predicts the bit state of the first component signal 202 in a state 308, which is indicative of a partial recognition of the collision signal 206. Similarly, in a state 310, the signal processing component 122 determines or predicts the bit state of the second component signal 204, which is also indicative of a partial recognition of the collision signal 206.

Once predictions are generated in the states 308, 310, the signal processing component 122 generates, in a state 312, the first and second component models 232, 234 from the predictions and also generates the likely collision model 236 from the generated first and second component models 232, 234 in a manner as described in FIG. 3B. Next, in a state 314, the signal processing component 122 compares the collision model 236 to the received collision model 236 to determine a match. If, in a first decision state 316, the signal processing component 122 determines that the collision model 236 closely resembles the collision signal 206, which may be based on predetermined criteria, then the signal processing component 122 proceeds to re-transmit the separated component signals 202, 204 in a manner as previously described. Then, the partial recognition process 300 terminates in an end state 322. It should be appreciated that the pre-determined criteria may comprise a range of threshold values indicative of acceptable waveforms. In one aspect, the signal processing component 122 may generate a look-up waveform table comprising one or more indexed waveforms that simulate closely related component models and/or collision models.

However, if, in the first decision state 316, the signal processing component determines that the collision model 236 does not closely resemble the collision signal 206, then the process 300 advances to a second determination state 318. In the state 318, the signal processing component 122 determines whether to continue with processing the collision signal 206 or terminate the process 300 in the end state 322. If the signal processing component determines that the re-modeling of the collision signal 206 is desirable, then the process 300 advances to the state 306 to re-initiate the modeling process. Otherwise, the process 300 is terminated in the end state 322.

Advantageously, the integration of transmission traffic monitoring with the signal separation using the partial recognition scheme produces a flexible yet powerful method of insuring compatibility and stability among a plurality of frequency-overlapping wireless communication devices in a wireless network. The addition of a centralized signal separation device in a wireless communication network may improve data throughput, prevent undesirable data corruption, and deter network latency. Moderation of frequency-overlapping protocols using the herein described wireless traffic signal separation device, system, functions, and methods permits the use of various classes of wireless communication devices, which were until now incompatible with one another.

Although the following description exemplifies one embodiment of the present invention, it should be understood that various omissions, substitutions, and changes in the form of the detail of the apparatus, system, and method as illustrated as well as the uses thereof, may be made by those skilled in the art, without departing from the scope of the present invention. Consequently, the scope of the present invention should not be limited to the disclosed embodiments, but should be defined by the appended claims.

What is claimed is:

1. A wireless network collision rectification device used to resolve collisions between data exchange protocols comprising a first protocol and a second protocol which operate using overlapping communication frequencies, the device comprising:
   a monitoring component, which receives a plurality of signal transmissions and generates a collision signal indicative of frequency-overlapping signal transmissions between the first and second protocols;
   a modeling component, which accepts the collision signal and produces a characteristic waveform which identifies a plurality of component parts of the collision signal corresponding to the first and the second protocols; and
   a separation component, which isolates one or more of the plurality of component parts of the collision signal by resolution of the characteristic waveform and recovers one or more of the isolated component parts for subsequent transmission using at least one of the protocols.

2. The device of claim 1, wherein the separation component identifies the plurality of component parts of the collision signal by comparison with a plurality of predicted waveforms generated by modeling combinations of component parts of the first and the second protocols.

3. The device of claim 1, wherein the separation component models the predicted waveforms using a bit combination pattern which is compared to the collision signal to identify bitwise information contained in the first and the second protocols.

4. The device of claim 1, wherein the separation component utilizes a direct resolution scheme in which one or more modeled waveforms are compared to the collision signal to identify waveform components resultant from the first and the second protocol.

5. The device of claim 1, wherein the separation component utilizes a time domain identification scheme to determine the transmitted data resultant from the first and the second protocol, and wherein the collision signal is subdivided into sections based at least in part on the timing of the transmission.

6. The device of claim 1, wherein the separation component performs a component waveform matching analysis to identify component parts of the collision signal resulting from the first and the second protocol.

7. The device of claim 1, wherein the separation component performs a partial recognition analysis to identify component parts of the collision signal resulting from the first and the second protocol.

8. The device of claim 1, wherein the separation component performs pattern recognition analysis to identify component parts of the collision signal resulting from the first and the second protocol.

9. A collision resolution device for a wireless communication network in which data is transmitted using a first protocol and a second protocol which operate with overlapping communication frequencies, the device comprising:
   a monitoring component, which monitors the information transmissions and identifies frequency-overlapping data collisions between the first and the second protocols, wherein the collisions comprise a first component signal derived from the first protocol and a second component signal derived from the second protocol; and an extraction component, which analyzes the data collisions and separates the first and second component signals.

10. The device of claim 9, wherein the collision resolution device further comprises a transmission component, which transmits one or more of the separated component signals in a non-frequency-overlapping manner.

11. The device of claim 9, wherein the extraction component separates the first and second component signals by comparison with a plurality of predicted waveforms generated by modeling collisions between the first and the second protocols.

12. The device of claim 9, wherein the extraction component models the waveforms of the first and second component signals using a bit combination pattern which is compared to the collision signal to identify bitwise information contained in the first and the second protocols.

13. The device of claim 9, wherein the extraction component utilizes a direct resolution scheme in which one or more modeled waveforms are compared to the collision signal to identify waveforms of the component signals resultant from the first and the second protocol.

14. The device of claim 9, wherein the extraction component utilizes a time domain identification scheme to determine the data of the transmitted component signals resultant from the first and the second protocol.

15. The device of claim 9, wherein the extraction component performs a waveform matching analysis to identify the component signals of the collision signal resulting from the first and the second protocol.

16. The device of claim 9, wherein the extraction component performs a distance pattern matching analysis to identify component signals of the collision signal resulting from the first and the second protocol.

17. The device of claim 9, wherein the extraction component performs pattern recognition analysis to identify component signals of the collision signal resulting from the first and the second protocol.

* * * * *